Sept. 2, 1969  K. T. KULP ET AL  3,465,314
MAGNETIZABLE ANALOG SAMPLING DETECTOR
Filed March 13, 1967  4 Sheets-Sheet 1

INVENTORS
LANNY L. HARKLAU
KARL T. KULP
BY Thomas J. Nikolai
ATTORNEY

INVENTORS
LANNY L. HARKLAU
KARL T. KULP
BY Thomas J. Nikolai
ATTORNEY

United States Patent Office 3,465,314
Patented Sept. 2, 1969

3,465,314
MAGNETIZABLE ANALOG SAMPLING DETECTOR
Karl T. Kulp and Lanny L. Harklau, Minneapolis, Minn., assignors to Sperry Rand Corporation, New York, N.Y., a corporation of Delaware
Filed Mar. 13, 1967, Ser. No. 622,779
Int. Cl. G11c 7/00, 27/00
U.S. Cl. 340—174          9 Claims

ABSTRACT OF THE DISCLOSURE

An analog signal sampling detector that stores the level of the discrete sampled portion of an analog signal in a magnetizable memory element as a function of the degree of the partial switching of the element's magnetic flux.

Background of the invention

Ordinary magnetizable cores and circuits utilized in destructive readout devices are now so well-known that they need no special description herein. However, for purposes of the present invention, it should be understood that such magnetizable cores are capable of being magnetized to saturation in either of two directions. The term "magnetizable" material as used herein shall designate any substance having a remanent magnetic flux density that is substantially high i.e., approaches the flux density at magnetic saturation. These cores are formed of magnetizable material selected to have a rectangular hysteresis characteristic which ensures that after the core has been saturated in either direction a definite point in magnetic remanence representing a residual flux density in the core will be retained. The residual flux density representing the point of magnetic remanence in a core possessing such characteristics is preferably of substantially the same magnitude as that of its maximum saturation flux density. These magnetizable core elements are usually connected in circuits providing one or more input coils for purposes of switching the magnetization of the core from one magnetic state corresponding to a particular direction, or polarization, of saturation, i.e., positive saturation denoting a binary "1," to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of suffcient magnitude through the input winding in a manner so as to set up a magnetic field in the area of the magnetizable core in a sense opposite to the pre-existing flux direction, thereby driving the core to saturation in the opposite direction of polarity, i.e., a positive to negative saturation. When the core switches, the resulting magnetic field variation induces a signal in the windings on the core such as, for example, the above mentioned output or sense windings.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the intensity of the magnetomotive force applied to the core. This is due to the fact that the duration of the drive signal is made sufficiently long to cause the flux density of such core to build up to the maximum possible flux value attainable with the particular magnetomotive force applied, i.e., the magnetomotive force is applied for a sufficient time duration to allow the core flux density to reach a steady-state condition with regard to time. The core flux density thus varies with the amplitude of the applied field rather than with the duration and amplitude of the applied field.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its saturated conditions. A second drive field having a predetermined amplitude and polarity opposite to that of the first drive field is applied to the core for a duration insufficient to alloy the core flux density of the seocnd stable state normally used for drive field places the core in a time-limited stable state, the flux density of which is considerably less than the flux density of the second stable state normally used for conventional, or saturated, operation. The article "Flux Distribution in Ferrite Cores under Various Modes of Partial Switching," R. H. James et al., Journal of Applied Physics, Supplement, vol. 32, No. 3, pages 38S–39S, March 1961 provides excellent background material for the time-limited switching technique utilized in the present invention, Additionally, the article "Sampling and Analog Recording with Square-Loop Magnetic Devices," R. H. James et al., IEEE Trans, on Mag., vol. MAG–1, No. 4, December 1965, pp. 269–299 provides excellent background material for analog storage techniques.

The present invention is an improvement invention over that of the copending patent application of R. H. James, Ser. No. 321,909 filed Nov. 6, 1963 now Patent No. 3,373,411 and assigned to the Sperry Rand Corporation as is the present invention. In this copending patent application of R. H. James there is disclosed an analog signal sampling detector that is concerned with the establishment of a predeterminably variable magnetic flux level in a magnetizable memory device which flux level is representative of the amplitude of an incremental portion of a transient electrical signal. In the preferred embodiment an incremental portion of a transient signal from a first source is gated into the magnetic device by a strobe pulse from a second source. The maximum amplitude of the transient signal is limited to a level well below the switching threshold $NI_0$ of the magnetic device such that the transient signal alone is incapable of affecting the flux level of the magnetic device concerned by inducing irreversible switching therein. The strobe pulse is of an amplitude sufficient to switch the flux level of the magnetic device from a first saturated state to a second and opposite saturated state but is of such limited duration so as to preclude such complete flux reversal. However, such duration is sufficient to set the flux level in an intermediate time-limited flux state. Different incremental portions of the transient signal may be gated into the magnetic device by delaying the transient signal different time increments with respect to the strobe pulse; each different time delayed increment of the transient signal is gated by the strobe pulse into a separate magnetic device so that each separate magnetic device stores a flux level that is representative of the net magnetomotive force effect of the strobe pulse and that portion of the transient signal that is gated by the strobe pulse. The terms "signal," "pulse," etc., when used herein shall be used interchangeably to refer to the current signal that produces the corresponding magnetic field and to the magnetic field that is produced by the corresponding current signal.

Summary of the invention

The preferred embodiment of the present invention is concerned with a device similar to that disclosed in the above discussed R. H. James patent application, but is directed toward an improvement thereof. The magnetizable analog sampling detector of the present invention includes two magnetizable cores arranged in the "buck-out" configuration with an attenuator means inserted in the input signal line electrically intermediate the two cores and a delay means inserted in the strobe line electrically intermediate the two cores. The improved arrangement of the present invention provides a sampling window that is independent of the characteristics of the magnetizable elements utilized. Additionally, the effective sampling window may be changed for different operating conditions while using passive components that are substantially immune to nuclear radiation environments. The attenuator inserted in the input signal line is essentially a current divider device for providing two different input signal amplitudes to the two cores while the delay inserted in the strobe line couples two different-time delayed pulse-like strobe signals to such cores. The attenuator-delay arrangement of the present invention provides a sampling window that is substantially shorter than that provided by the device of the copending R. H. James application; the sampling window width being substantially equal to the time delay between the initiation of the two strobe pulses.

Theory of operation

A mathematical description of the sampling window of a magnetizable core makes the discussion of a magnetizable sampling device more precise. The following general mathematical analysis yields a method of describing the sampling window of such a device.

The sampling window $F(t)$ is defined as that function that multiplies the signal input $S(t)$. The product of $F(t)$ and $S(t)$ is $P(t)$ or, $$P(t) = F(t)S(t) \qquad (1)$$

Figure 2:
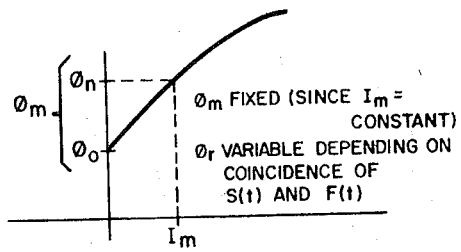
FIG. 2 is an illustration of the magnetizing current I versus the switched flux $\phi$ for the linear region $\phi_0$ to $\phi_n$.

The present invention is directed toward the change in flux, $\phi$, that is due to the multiplication of the signal $S(t)$ by the sampling window $F(t)$. A method of determining $F(t)$ is set out below. The total change in flux $\phi_r$ of a magnetizable core is the change from the initial set state $\phi_0$—see FIG. 2, $$\phi_r = \int_{-\infty}^{\infty} P(t)dt = \int_{-\infty}^{\infty} F(t)S(t)dt \qquad (2)$$

The total change in flux $\phi_r$ can also be thought of as the change in the output signal at read time due to the multiplying process.

Figure 1A:
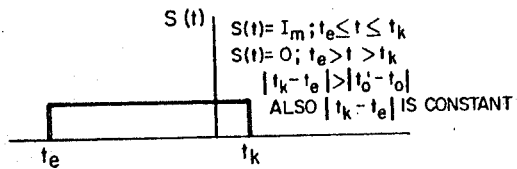
FIG. 1a is an illustration of the input signal $S(t)$.
Figure 1B:
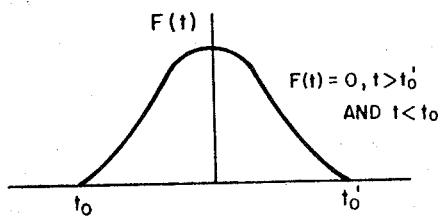
FIG. 1b is an illustration of the sampling window $F(t)$.

Assume an $S(t)$ of the form shown in FIG. 1a. The function $F(t)$ is some finite function that describes the sampling window. The particular shape of $F(t)$ between $t_0$ and $t_0'$ is not important to this description; FIG. 1b is used as an example. $I_m$ is the current signal defined as that current that switches $\phi_m$ according to the relationship shown in FIG. 2 where $\phi_0$ is defined as the initial flux state that is determined by the strobe pulse alone and where $\phi_m = \phi_n - \phi_0$. If no signal is present then $\phi_n = \phi_0$ and $\phi_m = 0$.

If the sampling window shown in FIG. 1b is completely overlapped by the signal shown in FIG. 1a then, $$\phi_t = \phi_m = \int_{-\infty}^{\infty} P(t)dt = \int_{-\infty}^{\infty} S(t)F(t)dt$$

As shown in FIG. 1a, $t_0$ and $t_k$ corespond to the times at which the signal rises to $I_m$ and falls to 0, respectively. Assume that $t_k$ and $t_e$, as shown in FIG. 1a, can be varied continuously over the range of $t$ from $t_0$ to $t_0'$.

The output for $t_0 < t_k < t_0'$ is $$\phi_r(t_k) = \int_{-\infty}^{\infty} S(t)F(t)dt$$

$$= \int_{t_0}^{t_k} S(t)F(t)dt$$

but over the range of $t$ from $t_0$ to $t_k$, $S(t)$ is simply $\phi_m$ so that $$\phi_r(t_k) = \phi_m \int_{t_0}^{t_k} F(t)dt \qquad (3)$$

In Equation 3, $t_0$ can be considered fixed in time and $t_k$ is variable over $t_0 < t_k < t_0'$. A similar derivation for $t_0 < t_e < t_0'$ results in $$\phi_r(t_e) = \phi_m \int_{t_e}^{t_0'} F(t)dt \qquad (4)$$

Figure 3A:
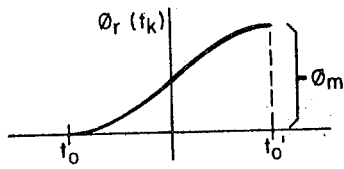
FIGS. 3a and 3b are illustrations of the plots of $\phi_r(t_k)$ and $\phi_r(t_e)$ for the sampling window $F(t)$ of FIG. 1b.
Figure 1C:
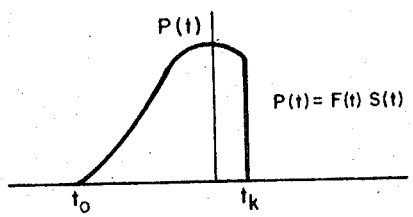
FIG. 1c is an illustration of the product $$P(t) = F(t)S(t)$$
Figure 3B:
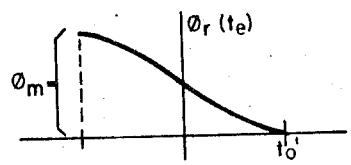

Equations 3 and 4 can be looked at as forms of the cumulative distribution for $F(t)$. A plot of Equations 3 and 4 are shown in FIG. 3 for a sampling window as shown in FIG. 1b. FIG. 3 is shown in the form that the experimental data is taken but is not the function obtained for a ferrite core. $F(t)$ (sampling window) can be found from Equations 3 and 4 by differentiation (see Advanced Calculus, A. C. Taylor, Ginn & Co. 1955 p. 53). Upon differentiation, Equation 3 yields:

$$(d/dt)\phi_r(t_k) = \phi_m F(t_k)$$

$$F(t_k) = 1/\phi_m (d/dt)\phi_r(t_k) \qquad (5)$$

and Equation 4 yields:

$$F(t_e) = -1/\phi_m (d/dt)\phi_r(t_e) \qquad (6)$$

Figure 4:
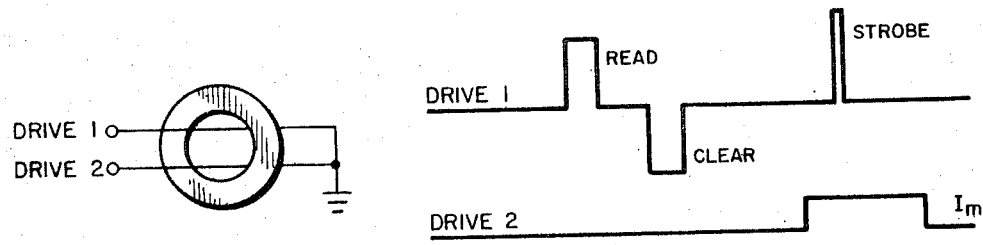
FIG. 4 is an illustration of the apparatus and drive signal waveforms used to determine the sampling window $F(t)$ of a toroidal ferrite core.
Figure 5:
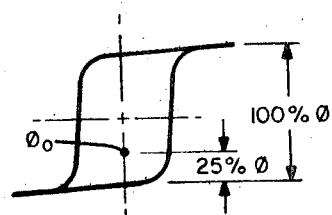
FIG. 5 is an illustration of the hysteresis loop characteristic of the core of FIG. 4.

The above theory is used to determine the sampling window of a magnetizable core operated in accordance with FIG. 4. The rise time of the current signal $I_m$ is made much less than the sampling window width so that the measured shape of the sampling window will not be appreciably distorted by the rise time of the signal. The square wave signal $I_m$ is continuously moved through the strobe pulse. Data is taken continuously using an X–Y recorder. The time of the signal relative to the strobe pulse (i.e. relative to the sampling window) is used as the X-axis, and the integrated core output (i.e. flux switched by the read pulse) is the Y-axis. The initial flux state $\phi_0$ is arbitrarily taken as 25% of the total flux $\phi$—see FIG. 5—in order to keep $\phi_m$ in the linear region of FIG. 2.

Figure 6A:
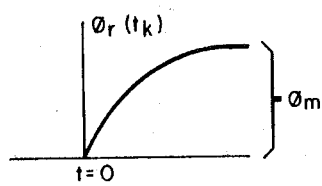
FIGS. 6a and 6b are illustrations of the plots of the data taken using the system of FIG. 4.
Figure 6B:
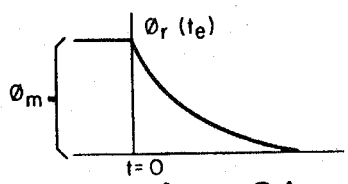

The experimental data taken using the system of FIG. 4 has the form of FIG. 6.

An analysis of this data suggests that it follows very closely a function of the form $\phi_r(t_e) = \phi_m e^{-t/a}$ and $\phi_r(t_k) = \phi_m(1-e^{-t/a})$; where $e$ is the base of the natural logarithm. The constant $a$ is the time from $t(\phi=0)$ to $t(\phi=.632\phi_m)$ in the case of $\phi_r(t_k)$, and in the case of $\phi_r(t_e)$ it is equal to the time from $t(\phi=\phi_m)$ to $t(\phi=.368\phi_m)$. These times can be recognized as one time constant of the exponential function. The experimental data shows the particular value of $a$ to be approximately equal for the case of $t_k$ and $t_e$, and, moreover, to be relatively independent of the particular value of $\phi_m$, as long as $$NI_m < NI_o$$

Supplementary data indicates that the value of $a$ is dependent on the type of material and the geometry of the magnetizable elements utilized.

Figure 8A:
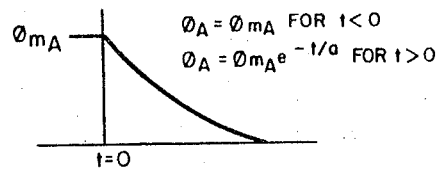
FIGS. 8a and 8b are illustrations of the plots of the flux $\phi$ from the time $t_0$ for cores A and B of the system of FIG. 7.
Figure 8B:
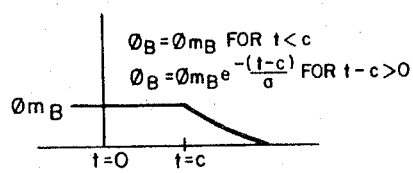
Figure 7:
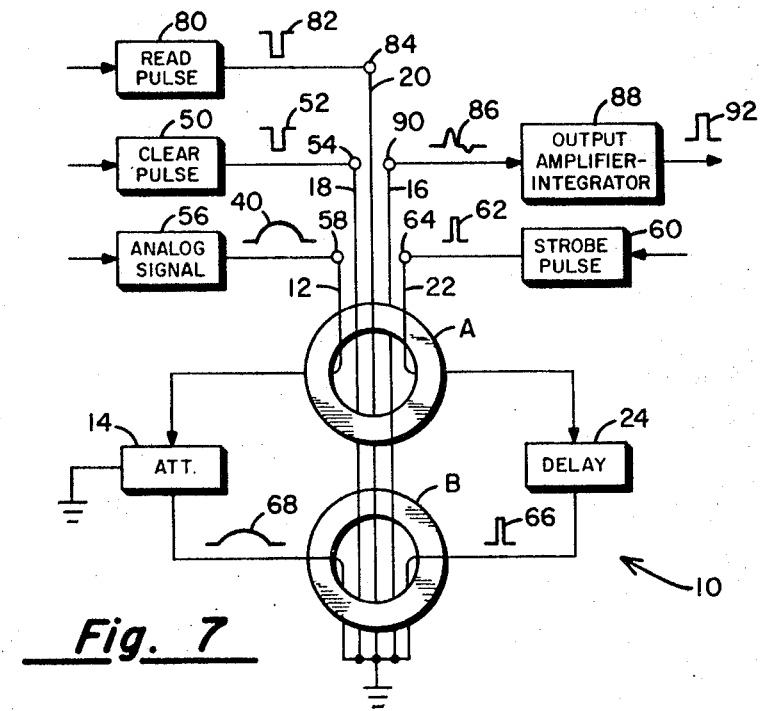
FIG. 7 is an illustration of the preferred embodiment of a magnetizable analog sampling detector that incorporates the inventive concept of the present invention.

The exponential output function of FIG. 6 suggests the use of a sampling system using two similar toroidal cores. FIG. 7 shows the drive arrangement for the two core (buck-out) system. The constant $c$ is the delay time in the strobe pulse line between cores A and B. FIGS. 8a and 8b illustrate the graphical presentation of $\phi_{rB} = \phi_B$ and $\phi_{rA} = \phi_A$ where $\phi_{rB}$ is used to describe $\phi_r$ for core B and $\phi_{rA}$ is used to describe $\phi_r$ for core A.

If the attenuator in the signal drive line is chosen such that the current to core B ($I_{mB}$) causes $\phi_{mB}$ at $t=c$ to equal the value of $\phi_A$ at $t=c$, then $\phi_A - \phi_B = 0$ for $t \geq c$; note, the subscripts A and B relate to cores A and B of FIG. 7. More specifically, if $\phi_{mB}$ at $t=c$ is constrained to the value of $\phi_A$ at $t=c$, then:

$$\phi_A(t=c) = \phi_{mB}$$
$$\phi_{mA} e^{-c/a} = \phi_{mB}$$

or the ratio of $\phi_{mB}$ to $\phi_{mA}$ is:

$$\frac{\phi_{mB}}{\phi_{mA}} = e^{-c/a} \text{ (constrained condition)} \quad (7)$$

i.e., this in effect defines the attenuator (current ratios) to be used for a given $c$ and $a$, i.e., attenuator current ratio $= I_{mB}/I_{mA} = e^{-c/a}$. The buck-out sense winding shown in FIG. 4 subtracts $\phi_B$ from $\phi_A$. Pet $\phi_N$ be the net flux. Then, $$\phi_N = \phi_A - \phi_B = \phi_{mA} e^{-t/a} - \phi_{mB} e^{-(t-c)/a}$$
$$= \phi_{mA} e^{-t/a} - \phi_{mA} e^{-c/a} e^{-(t-c)/a} \quad (8)$$

where the last expression is obtained by the constraint condition Equation 7. Continuing, $$\phi_N = \phi_{mA} e^{-t/a} - \phi_{mA} e^{-t/a} = 0 \quad (9)$$

Figure 9:
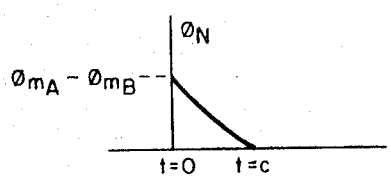
FIG. 9 is an illustration of the difference between the curves of FIGS. 8a and 8b.
Figure 10:
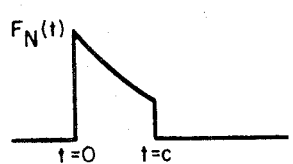
FIG. 10 is an illustration of the negative of the first derivative of the curve of FIG. 9.

The last expression is then the net flux obtained when $t$ is greater than $c$. This in effect says that the device is sensitive only over the time interval $c$. Subtracting FIG. 8a from FIG. 8b results in FIG. 9. According to Equation 6, the shape of the effective sampling window, as shown in graphical terms in FIG. 10, is the negative of the slope of FIG. 9; $F_N(t)$ is the effective sampling window.

The effective sampling window is then as wide as the delay time in the strobe line, and it can be very small with respect to the sampling window of a core operating in the manner described in the above discussed copending application of R. H. James.

The detector 10 shown in FIG. 7 is a modification of that illustrated in the R. H. James application. The two-core configuration of FIG. 7 utilizes: a signal line 12 with a specifically chosen attenuator 14—chosen by Equation 7—electrically intermediate the cores; a buck-out output, or sense, line 16; a clear line 18; a read line 20; and, a strobe line 22 with a time delay 24 electrically intermediate the cores. Since the time delay in the strobe line between the cores can be very short compared to the time constant of the integrator used for read-out, the strobe, read, and clear pulses could be on the same line without introducing appreciable changes in the operation of the detector. In contrast, the R. H. James application utilizes a two-core detector with: a signal line; a clear, strobe, and read line; and, a sense line.

Note also that the signal is applied to both cores A and B with a specifically chosen attenuator 14 in the signal drive line between the cores. The attenuator functions as a current divider to reduce the signal to core B in order to meet the constraint condition (Equation 7). The buck-out configuration of the output-sense winding 16 causes the flux switched by the read operation in core B to be subtracted from the flux switched by the read operation in core A. Thus, the output is proportional to the net flux. The theoretical analysis indicates that the sampling window is about as wide as the delay time in the strobe line.

The minimum width of the sampling window is limited since as $c \to 0$, $(\phi_A - \phi_B) \to 0$. It is desirable for many reasons to have the output signal as large as possible, and, therefore, it is desirable to have the time constant $a$ as short as possible for a given window width. It is to be understood that the present invention is not limited to the use of the illustrated toroidal ferrite cores. For example, Transfluxor elements, Biax elements, etc. could be used if a drive scheme that is appropriate for the particular magnetizable element used were employed.

Description of the preferred embodiments

Figure 11:
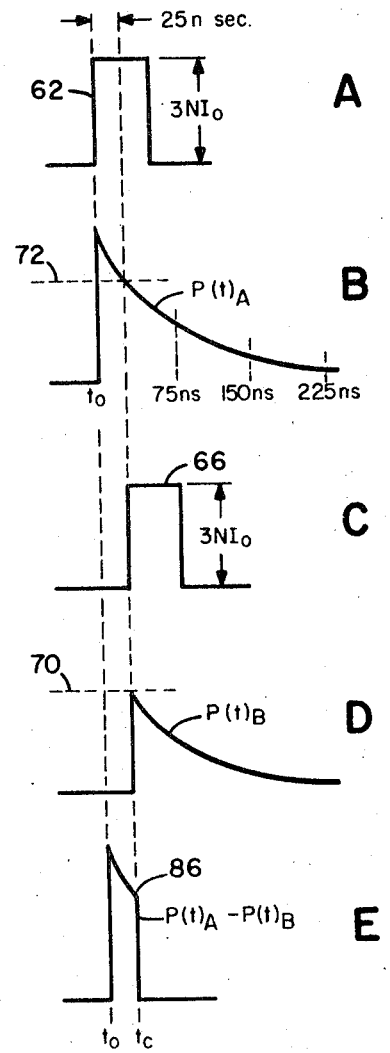
FIGS. 11A–11E are illustrations of the strobe pulses and the associated amplified sampling windows of Cores A and B of FIG. 7 producing the effective sampling window $P(t)_A - P(t)_B$.

With reference back to FIG. 7 there is illustrated a preferred embodiment of a magnetizable analog sampling detector 10 incorporating the inventive concept of the present invention. The detector 10 of FIG. 7 includes two toroidal ferrite cores A and B intercoupled by a plurality of drive lines 12, 18, 20 and 22 and a single output-sense line 16 whereby the magnetization of cores A and B are established into time-limited flux levels that are indicative of a sampled portion of an analog signal 40. With particular reference to FIG. 11 there is presented an exemplary set of waveforms associated with the operation of detector 10 of FIG. 7 diagrammatically illustrating the determination of the effective amplified sampling window 86 of detector 10.

The attenuator 14 functions as a current divider to reduce the effective amplitude of the transient signal that is coupled to core B as compared to that effective amplitude that is coupled to core A. This current reduction is effective to reduce the multiplied, or amplified, value of the peak value of the sampling window of core B, e.g. at time $t_c$ to the multiplied value of the sampling window, i.e., the instantaneous sampling window amplitude times the concurrently applied instantaneous transient signal amplitude, of core A at time $t_c$. With this combination of attenuation ratio and strobe pulse delay the buck-out core arrangement of cores A and B has, at time $t_c$ and subsequent, substantially equal partially-switched flux level magnetomotive forces coupled to such cores. Accordingly, upon readout these equal flux levels in cores A and B are substantially self-cancelling with respect to the net signal that is induced in the buck-out coupled output line 16. Thus, the effective partially-switched flux level established in core A during the effective sampling period of from time $t_0$ to time $t_c$ is the only effective source of the resultant output signal that is induced in the output line 16.

As an example of a typical operational sequence utilizing detector 10 as a device for storing a sampled portion of an analog signal, such as a signal 40, assume that cores A and B have had their magnetization set into an initial clear state by clear pulse source 50 coupling clear pulse 52 to terminal 54 of clear line 18. This initial clear state is preferably a substantially saturated state of a first polarity. Next, at time $t_0$ and concurrent with analog signal source 56 coupling signal 40 to terminal 58 of signal line 12 strobe pulse source 60 couples strobe pulse 62 to terminal 64 of strobe line 22. Strobe pulse 62—see FIG. 11a—along with the concurrent portion of signal 40 at core A generates the amplified sampling window $P(t)_A$ of core A as illustrated in FIG. 11b. Next, at time $t_c$ delay 24 couples a delayed strobe pulse 66—see FIG. 11c—to core B concurrently with attenuator 14 coupling an attenuated signal 68 to the said core B.

The conjoint action of strobe pulse 66 and signal 68 at core B produces an amplified sampling window $P(t)_B$ of core B as illustrated in FIG. 11d. The attenuator 14, as stated above, functions as a current divider whereby the peak value of the amplified sampling window $P(t)_B$ of core B at time $t_c$ is substantially equal to the value of the amplified sampling window $P(t)_A$ of core A at time $t_c$ as denoted by equal amplitude lines 70 and 72, respectively, of FIGS. 11d and 11b, respectively.

Next, at a subsequent read time read pulse source 80 couples read pulse 82 to terminal 84 of read line 20 switching the magnetization of cores A and B back into their initial first polarity substantially saturated state. This induces in output-sense line 16 two signals from cores A and B, which due to the buck-out arrangement of such sense line, provides an output signal 86—see FIG. 11e—that is indicative of the input signal amplitude at sample time. This effective amplified sampling window 86 of cores A and B is, as noted by such definition, the balance produced by the subtraction of the amplified sampling window of core B of FIG. 11d from the amplified sampling window of core A of FIG. 11b. This effective amplified sampling window 86 is coupled to output amplifier-integrator 88 by way of output terminal 90 emitting therefrom an output signal 92 the amplitude of which is representative of the amplitude of the sampled portion of analog signal 40.

Figure 13:
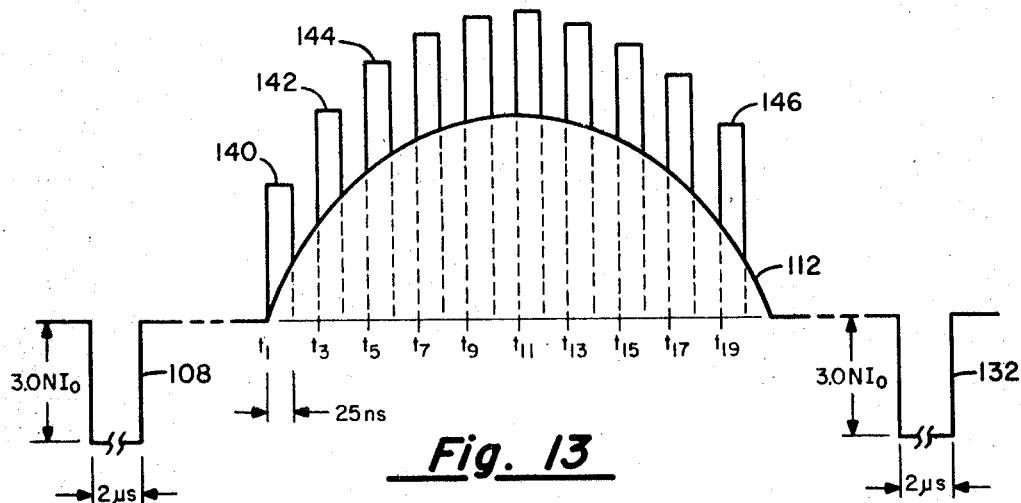
FIG. 13 is an illustration of the signal waveforms utilized with the system of FIG. 12.
Figure 12:
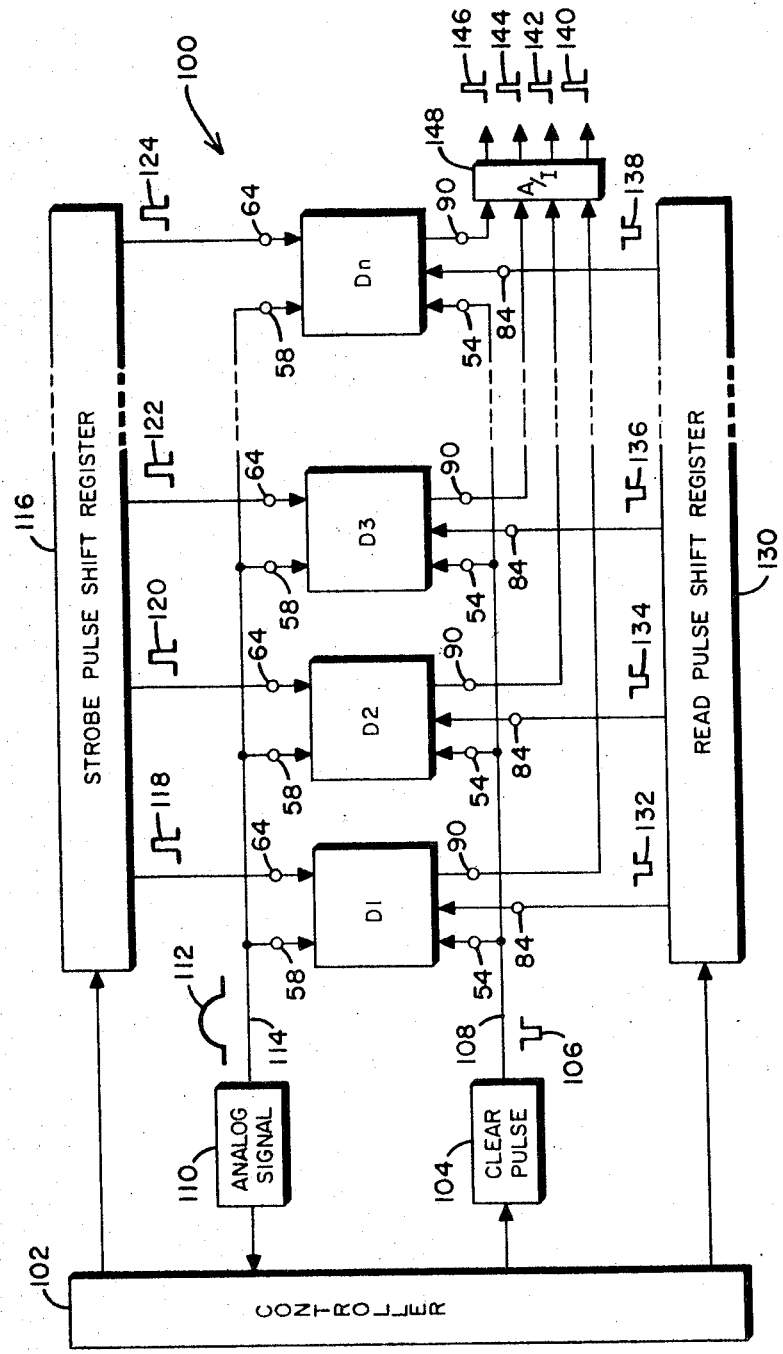
FIG. 12 is an illustration of an analog signal sampling system utilizing a plurality of the detectors of FIG. 7.

With particular reference to FIG. 12 there is illustrated an analog sampling system 100 which incorporates a plurality of similar magnetizable analog sampling detectors D1, D2, D3 . . . D$n$ wherein each of said detectors may be considered to be similar to detector 10 of FIG. 7. The operation of analog recording system 100 is initiated by controller 102 triggering clear pulse source 104 causing it to couple a clear pulse 106 to clear line 108 which line is coupled to all clear line input terminals 54 of the parallel arranged detectors D1–D$n$ causing the cores of such detectors to be established in an initial first polarity substantially saturated state. Next, at a time $t_1$, analog signal source 110 couples an analog signal 112 to line 114 which line is coupled in parallel to all analog signal line terminals 58 of detectors D1–D$n$. Additionally, at time $t_1$ controller 102 is triggered by analog signal source 110 which then triggers strobe pulse shift register 116 causing it to couple strobe pulses 118, 120, 122 . . . 124 to the associated strobe pulse input terminals 64 of the associated detectors D1–D$n$, respectively. These strobe pulses, 118, 120, 122 . . . 124 are emitted from strobe pulse source 116 at successive times $t_1, t_3, t_5 \ldots t_{19}$ causing the magnetization of the cores of the associated detectors D1, D2, D3 . . . D$n$ to be set into partially switched time-limited flux states corresponding to the amplitude of the analog signal 112 at the corresponding sample portion thereof. With particular reference to FIG. 13 there is illustrated an example of the waveforms and timing associated with the just described operation of system 100 wherein the effective sampling window of each detector is of a width of 25 nanoseconds (ns.) with each strobe pulse 118, 120, 122 . . . 124 coupled to associated detectors at successive intervals of 50 ns.

After the sampling operation wherein the detectors D1, D2, D3 . . . D$n$ are caused to store therein the amplitude of the discrete sample portion of analog signal 112 as partially switched flux levels of the associated magnetizable cores as described above the read operation may be initiated. The read operation of system 110 is initiated by controller 102 triggering read pulse shift register 130 causing it to couple read pulses 132, 134, 136 . . . 138 to the read line terminals 84 of such detectors in a time sequence similar to that applied for the write operation and as illustratively shown in FIG. 13. As in the above described write operation wherein system 100 incorporates 10 parallel arranged detectors, i.e., where $n$ of D$n$=10 system 100 is caused to emit from output amplifier-integrator 148 output pulses 140, 142, 144 . . . 146 each of which output signals has an amplitude that is representative of the amplitude of the sampled portion of analog signal 112 at the associated sampling time, i.e., $t_1, t_3, t_5 \ldots t_{19}$.

Thus, it is apparent that there has been described and illustrated herein a preferred embodiment of the present invention that provides an improved magnetizable analog sampling detector and a system thereof wherein the sampling window of such detectors is substantially shorter than that provided by prior art devices which shorter sampling window provides a more accurate reproduction of the sampled portion of a high frequency analog signal that is stored therein. As an example, the system of FIG. 12 could be rearranged to provide serial coupling of the read or clear lines or with the analog signal and its attenuated signal each separately serially coupled to the A core and to the B core. Additionally, a shift register could be utilized to provide the various individually delayed strobe pulses.

It is understood that suitable modifications may be made in the structure as disclosed provided that such modifications come within the spirit and scope of the appended claims. Having, now, fully illustrated and described our invention, what we claim to be new and desire to protect by Letters Patent is set forth in the appended claims.

What is claimed is:

1. A magnetizable analog sampling director, comprising:

two substantially similar magnetizable memory elements having substantially rectangular hysteresis characteristics and substantially similar sampling windows and being capable of being operated in a time-limited, an amplitude-limited, or a saturated magnetic condition as a function of an applied magnetic field of a predetermined amplitude-duration characteristic;

analog signal means for inductively coupling a relatively-long-duration analog signal to said detector, since analog signal means coupling first and second current signals to said first and second elements, respectively, which signals are representative of said analog signal and are in a predetermined ratio;

strobe pulse means for inductively coupling a strobe pulse to said two elements, said strobe pulse means including a delay means for causing a second strobe pulse to be coupled to said second element a predetermined delay time $c$ after a first strobe pulse is coupled to said first element; and, means for causing said first and second strobe pulses and said first and second current signals, respectively, to be concurrently coupled to the associated first and second elements, respectively, for causing said detector to have an effective sampling window that is of a width $c$ for sampling a portion of said analog signal.

2. The detector of claim 1 wherein the amplitude of said analog signal sampled portion is stored in said detector as different time-limited magnetic states in said two elements.

3. The detector of claim 2 further including clear pulse means for causing the magnetization of said two elements to be initially set into a first polarity saturated clear state.

4. The detector of claim 3 further including a read pulse means for reading out the amplitude of said analog signal sampled portion by causing the magnetization of said two elements to be switched back into their initial, first polarity saturated clear state from their different time-limited magnetic states.

5. An analog sampling system, comprising:
   $n$ detectors, each in accordance with claim 2; and,
   means for causing each of said first and second strobe pulses to store at their associated detectors a different sampled portion of the associated analog signal.

6. A magnetizable analog sampling detector, comprising:
   two substantially similar magnetizable memory elements, each having a substantially rectangular hysteresis characteristic and both having substantially similar sampling windows and being capable of being operated in a time-limited, an amplitude-limited, or a saturated magnetic condition as a function of an applied magnetic field of a predetermined amplitude-duration characteristic;
   analog signal means for inductively coupling an analog signal to said detector, said analog signal means including an attenuator means electrically intermediate said two elements for causing first and second current signals that are coupled to said first and second elements, respectively, by said analog signal means to be in a predetermined ratio;
   strobe pulse means inductively coupled to said two elements, said strobe pulse means including a delay means electrically intermediate said two elements for causing a second strobe pulse to be coupled to said second element a predetermined delay time $c$ after a first strobe pulse is coupled to said first element; and,
   means for causing said first and second strobe pulses and said first and second current signals, respectively, to be concurrently coupled to said first and second elements, respectively, for causing said detector to have an effective sampling window that is of a width $c$ for sampling a portion of said analog signal.

7. The detector of claim 6 wherein the amplitude of said analog signal sampled portion is stored in said two elements as different time-limited-magnetic states.

8. The detector of claim 7 further including clear pulse means for causing the magnetization of said two elements to be initially set into an initial partially switched clear state.

9. The detector of claim 8 further including a read pulse means for reading out the amplitude of said analog signal sampled portion by causing the magnetization of said two elements to be switched into one of their saturated states.

References Cited

UNITED STATES PATENTS

| | | | |
|---|---|---|---|
| 3,328,786 | 6/1967 | Hewitt et al. | 340—174 |
| 3,392,377 | 7/1968 | Harklan et al. | 340—174 |

BERNARD KONICK, Primary Examiner

GARY M. HOFFMAN, Assistant Examiner

UNITED STATES PATENT OFFICE

CERTIFICATE OF CORRECTION

Patent No. 3,465,314                  September 2, 1969

Karl T. Kulp et al.

It is certified that error appears in the above identified patent and that said Letters Patent are hereby corrected as shown below:

Column 8, line 46, "since" should read -- said --.

Signed and sealed this 21st day of April 1970.

(SEAL)
Attest:

Edward M. Fletcher, Jr.
Attesting Officer

WILLIAM E. SCHUYLER, JR.
Commissioner of Patents